US008459604B2

(12) United States Patent
Smith et al.

(10) Patent No.: US 8,459,604 B2
(45) Date of Patent: Jun. 11, 2013

(54) EXPANSION SPLICE PLATE FOR A CABLE TRAY RUN

(75) Inventors: Robert David Smith, Spring, TX (US); Brandon Michael Tally, Greenville, IL (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 13/566,005

(22) Filed: Aug. 3, 2012

(65) Prior Publication Data

US 2012/0292266 A1 Nov. 22, 2012

Related U.S. Application Data

(63) Continuation of application No. 12/833,079, filed on Jul. 9, 2010, now abandoned.

(60) Provisional application No. 61/225,769, filed on Jul. 15, 2009.

(51) Int. Cl.
*A47H 1/00* (2006.01)
*A47F 5/00* (2006.01)

(52) U.S. Cl.
USPC ............... 248/300; 248/57; 52/713; 52/715; 403/300; 403/306

(58) Field of Classification Search
USPC ............. 248/300, 57; 403/306, 300; 52/713, 52/714, 715
See application file for complete search history.

(56) References Cited

U.S. PATENT DOCUMENTS

| 3,494,645 | A |  | 2/1970 | Jureit |
| 4,549,838 | A |  | 10/1985 | Birckhead |
| 4,733,986 | A | * | 3/1988 | Kenning et al. ............... 403/306 |
| 5,639,048 | A |  | 6/1997 | Bartholomew et al. |
| 6,313,405 | B1 |  | 11/2001 | Rinderer |
| D472,792 | S |  | 4/2003 | Callahan et al. |
| 7,347,031 | B2 |  | 3/2008 | Callahan |

OTHER PUBLICATIONS

Cooper B-Line Catalog, Appendix—Mid-Span Splice, B-Line's 9A-6006 and 9A-6007 Aluminum Mid-Span Splice, 1 page, United States (admitted as prior art).
Figures 1 and 2 from U.S. Appl. No. 12/833,079, admitted prior art.
Cable Tray Systems, Sales Sheet regarding Series 2, 3, 4, & 5 Aluminum—Accessories, 1 page; admitted prior art.
Cable Tray Systems, Sales Sheet regarding Series 2, 3, 4, & 5 Steel—Accessories, 1 page; admitted prior art.

\* cited by examiner

*Primary Examiner* — Amy J. Sterling
(74) *Attorney, Agent, or Firm* — Senniger Powers LLP

(57) ABSTRACT

A cable tray expansion splice plate for connecting first and second cable tray sections end-to-end is disclosed. The splice plate includes an elongate body having a central section, an upper flange section, and a lower flange section. In one embodiment, the lower flange section defines a channel for receiving components of the first and second cable tray sections such that the lower flange section underlies the components. Fastener openings in the central section and the lower flange section receive fasteners to fasten the body to the cable tray sections. These openings include slots which permit the cable tray sections to move relative to one another in a longitudinal direction.

12 Claims, 13 Drawing Sheets

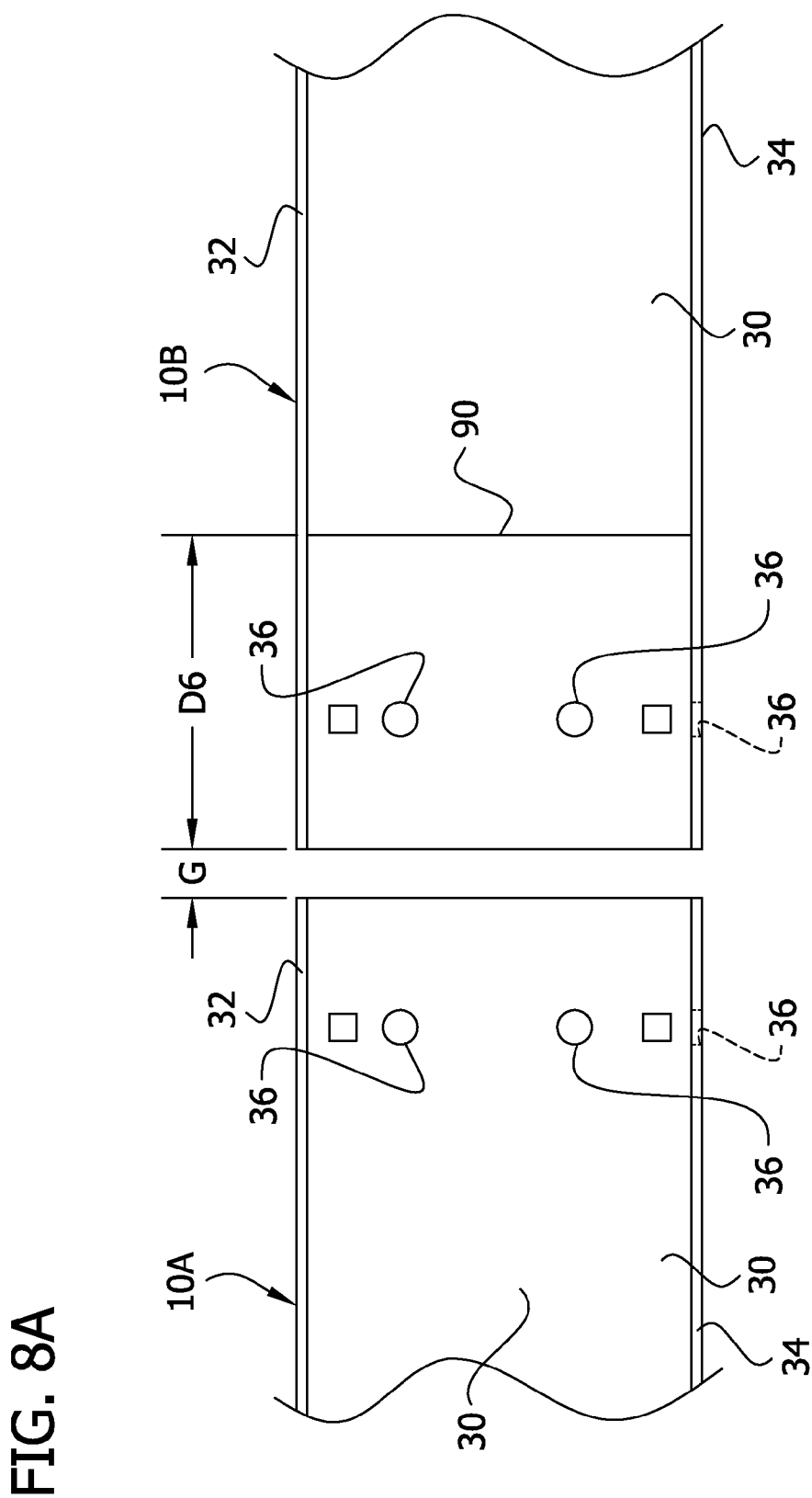

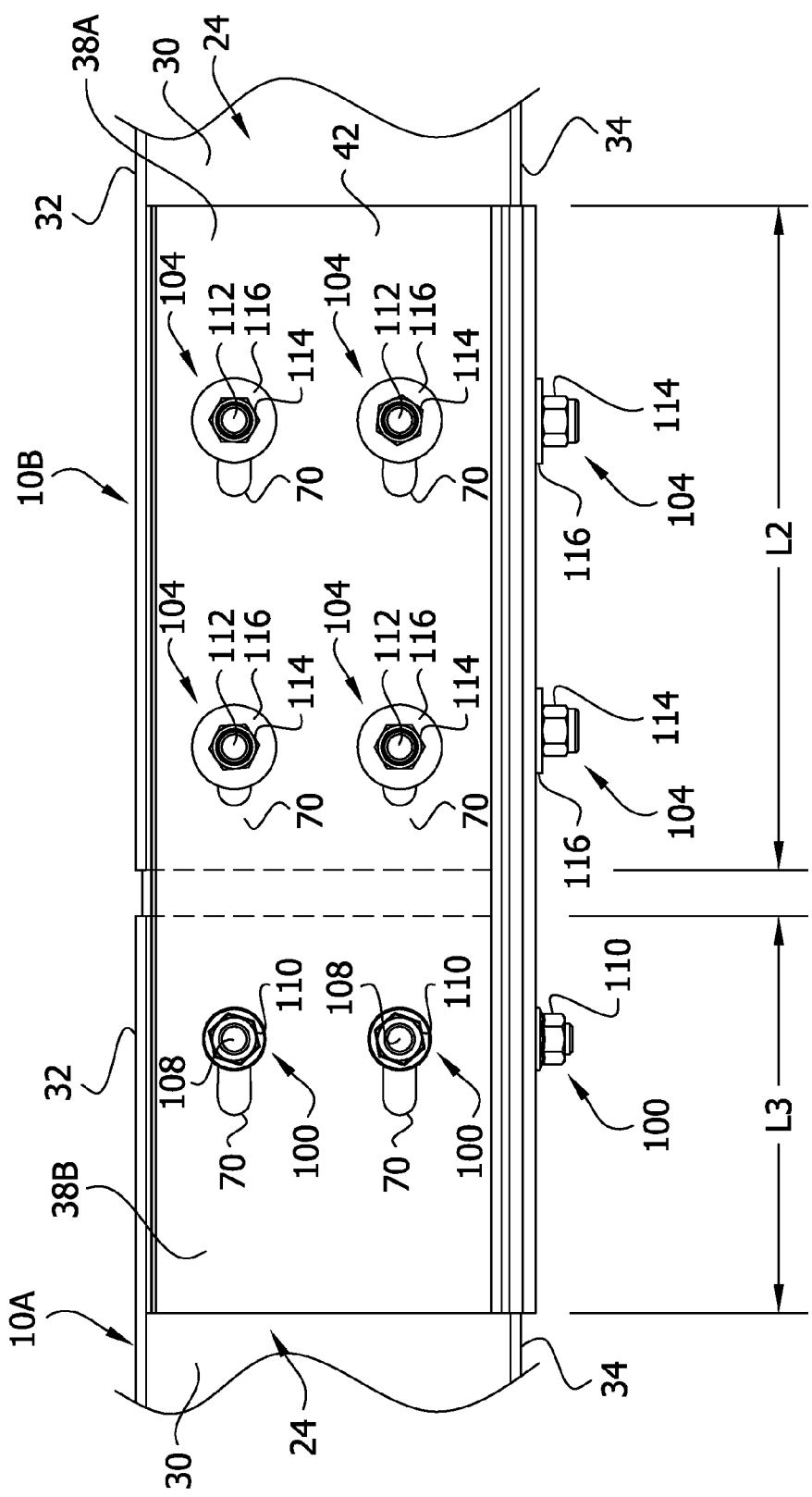

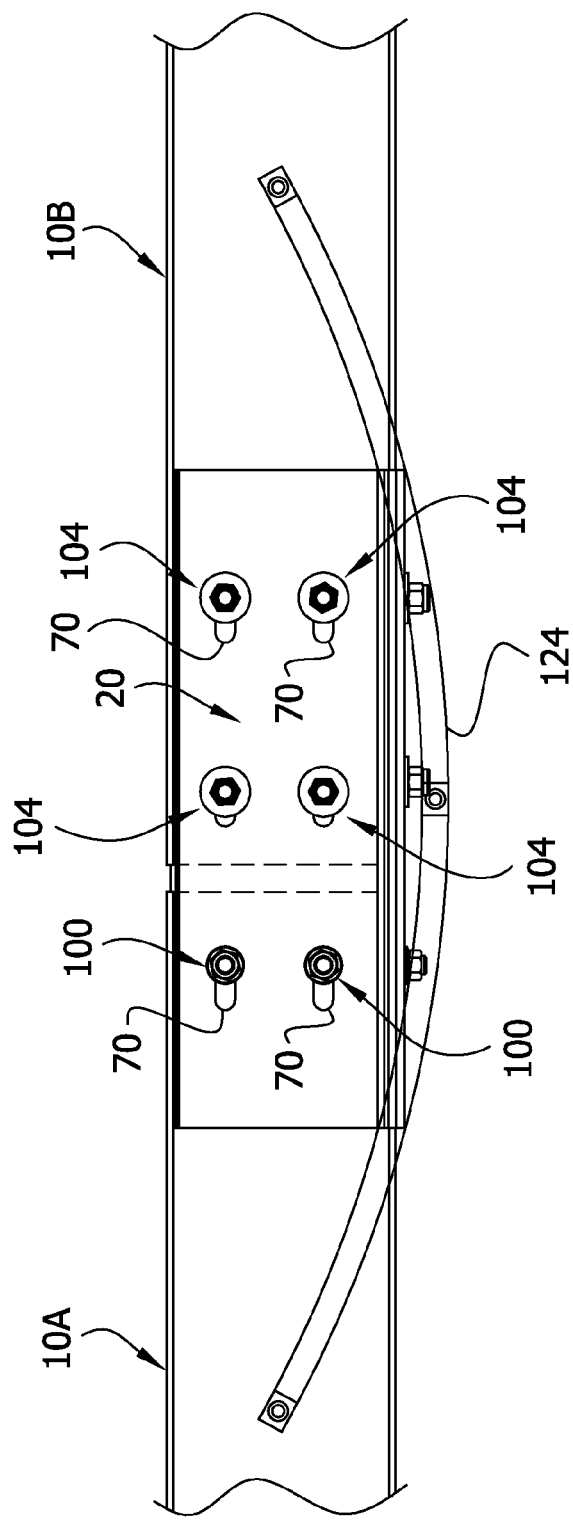

EXPANSION SPLICE PLATE FOR A CABLE TRAY RUN

CROSS-REFERENCE TO RELATED APPLICATION

This application is a continuation application of U.S. application Ser. No. 12/833,079, filed Jul. 9, 2010, which claims priority from U.S. Patent Application No. 61/225,769 (provisional), filed Jul. 15, 2009, each of which is hereby incorporated by reference in its entirety.

FIELD OF THE INVENTION

The present invention generally relates to an expansion splice plate for a cable tray run.

BACKGROUND OF THE INVENTION

Ladder-type cable tray is used by industry to support electrical cable. A length or section of ladder cable tray comprises a pair of side rails connected by cable-supporting rungs extending between the rails at intervals along the tray. Cable tray sections are spliced together using splice plates to form a cable tray run. Splicing cable tray sections using expansion splice plates is required when installing the cable tray run outdoors where temperature variations may cause thermal expansion and contraction of the cable tray sections.

FIG. 1 illustrates a conventional expansion splice plate for fiberglass cable tray. The splice plate, made of fiberglass, is generally L-shaped and is configured to be secured to adjoining sides (rails) of adjacent cable tray sections between upper and lower flanges of the rails. The conventional expansion splice plate includes a first set of openings for receiving fasteners to secure the splice plate to a rail of one of the adjacent cable tray sections. A second set of openings includes slot-shaped openings for receiving fasteners to secure the splice plate to a rail of the other of the adjacent cable tray sections. The slot-shaped openings allow for longitudinal movement of the tray sections relative to one another. A conventional expansion splice plate for metal cable tray (not shown) comprises a flat metal plate with slot-shaped fastener openings that permit longitudinal movement of the tray sections relative to one another.

Typically, supports, such as trapeze supports, are installed at every quarter span of the cable tray run, as illustrated in FIG. 2. However, when using the above-described conventional expansion splice plate, a support must be installed at each end of the adjacent tray sections to adequately support the splice. Thus, two supports must be installed for each tray section in addition to the support at each quarter span, making the installation process more time-consuming and expensive. Alternatively, elimination of one or more quarter-span supports will result in greater deflection of the cable tray run, which is undesirable.

SUMMARY OF THE INVENTION

In one aspect, a cable tray assembly generally comprises a first cable tray section including two parallel rails forming sides of the first cable tray section, each rail of the first cable tray section includes a generally vertical web and a lower generally horizontal flange at a lower end of the web. A second cable tray section includes two parallel rails forming sides of the second cable tray section, each rail of the second cable tray section includes a generally vertical web and a lower generally horizontal flange at a lower end of the web. A cable tray expansion splice plate connects the first and second cable tray sections end-to-end. The splice plate includes an elongate body having a length extending between opposite ends, a generally planar central section, an upper flange section extending laterally outward from an upper end of the central section, and a lower flange section extending laterally inward from a lower end of the central section, the lower flange section defining a channel for receiving the lower generally horizontal flange of each of the first and second cable tray sections such that the lower flange section underlies the lower generally horizontal flange of each rail. A first set of fastener openings is in the central section and the lower flange section of a first longitudinal portion of the body, and a first set of fasteners are received in the respective fastener openings of the first set of fastener openings fastening the first longitudinal portion of the body to the first cable tray section. Each fastener opening of the first set of fastener openings comprises a slot having a major axis extending lengthwise of the body to permit movement of the cable tray sections relative to one another in a direction extending longitudinally of the cable tray sections. A second set of fastener openings is in the central section and the lower flange section of the first longitudinal portion of the body, and a second set of fasteners are received in the respective fastener openings of the second set of fastener openings fastening the first longitudinal portion of the body to the first cable tray section. Each fastener opening of the second set of fastener openings comprises a slot having a major axis extending lengthwise of the body to permit movement of the cable tray sections relative to one another in a direction extending longitudinally of the cable tray sections. A third set of fastener openings is in the central section and the lower flange section of a second longitudinal portion of the body and a third set of fasteners are received in the respective fastener openings of the third set of fastener openings fastening the second longitudinal portion of the body to the second cable tray section. Each fastener opening of the third set of fastener openings comprises a slot having a major axis extending lengthwise of the body to permit movement of the cable tray sections relative to one another in a direction extending longitudinally of the cable tray sections. The first longitudinal portion of the body has a length that is greater than a length of the second longitudinal portion of the body.

In another aspect, a cable tray assembly generally comprises a first cable tray section including two parallel rails forming sides of the first cable tray section, each rail of the first cable tray section includes a generally vertical web and a lower generally horizontal flange at a lower end of the web. A second cable tray section includes two parallel rails forming sides of the second cable tray section, each rail of the second cable tray section includes a generally vertical web and a lower generally horizontal flange at a lower end of the web. A cable tray expansion splice plate connects the first and second cable tray sections end-to-end. The splice plate includes an elongate body having a length extending between opposite ends, a generally planar central section, an upper flange section extending laterally outward from an upper end of the central section, and a lower flange section extending laterally inward from a lower end of the central section. The lower flange section defines a channel for receiving the lower generally horizontal flange of each first and second cable tray sections such that the lower flange section underlies the lower generally horizontal flange of each rail. A first set of generally vertically-aligned fastener openings in the central section and the lower flange section of a first longitudinal portion of the body and a first set of fasteners received in the respective fastener openings of the first set of fastener openings fastening the first longitudinal portion of the body to the first cable tray section. Each fastener opening of the first set of fastener openings comprises a slot having a major axis extending lengthwise of the body to permit movement of the cable tray sections relative to one another in a direction extending longitudinally of the cable tray sections. A second set of generally vertically-aligned fastener openings in the central section and the lower flange section of the first longitudinal portion of the body and a second set of fasteners received in the respective fastener openings of the second set of fastener openings fastening the first longitudinal portion of the body to the first cable tray section. Each fastener opening of the second set of fastener openings comprises a slot having a major axis extending lengthwise of the body to permit movement of the cable tray sections relative to one another in a direction extending longitudinally of the cable tray sections. A third set of generally vertically-aligned fastener openings is in the central section and the lower flange section of a second longitudinal portion of the body and a third set of fasteners are received in the respective fastener openings of the third set of fastener openings fastening the second longitudinal portion of the body to the second cable tray section. Each fastener opening of the third set of fastener openings comprises a slot having a major axis extending lengthwise of the body to permit movement of the cable tray sections relative to one another in a direction extending longitudinally of the cable tray sections. The first longitudinal portion of the body has a length that is greater than a length of the second longitudinal portion of the body, the third set of fastener openings is the only set of generally vertically-aligned fastener openings in the central section and the lower flange section of the second longitudinal portion of the body.

Other objects and features will be in part apparent and in part pointed out hereinafter.

BRIEF DESCRIPTION OF THE DRAWINGS

FIGS. 8A-8E are schematic views illustrating steps for splicing adjacent ladder cable tray sections using the expansion splice plates of FIG. 3.

Corresponding reference characters indicate corresponding parts throughout the drawings.

DETAILED DESCRIPTION OF THE DRAWINGS

Figure 3:
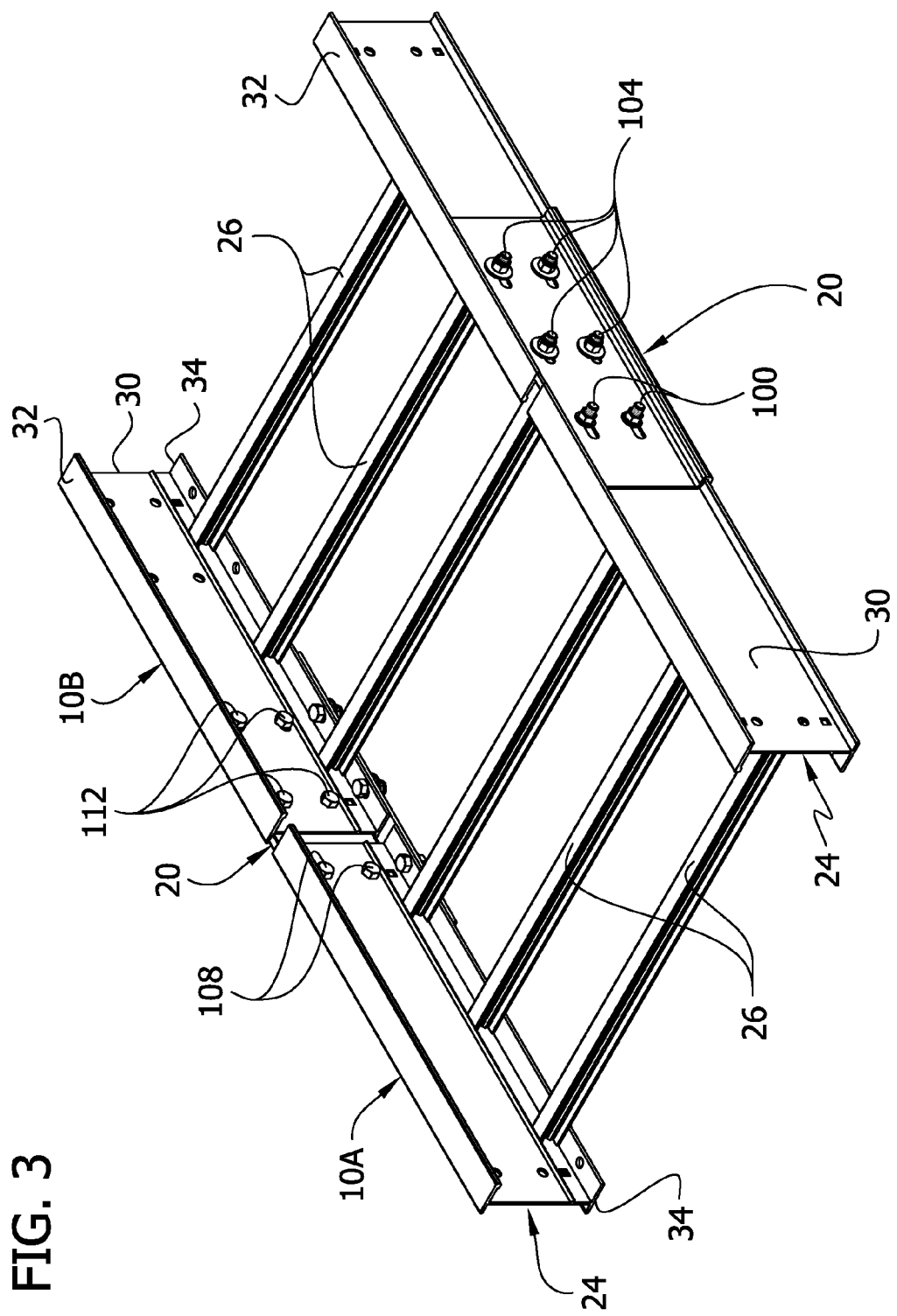
FIG. 3 is a perspective view of two sections of ladder cable tray connected by expansion splice plates of the present invention.
Figure 4:
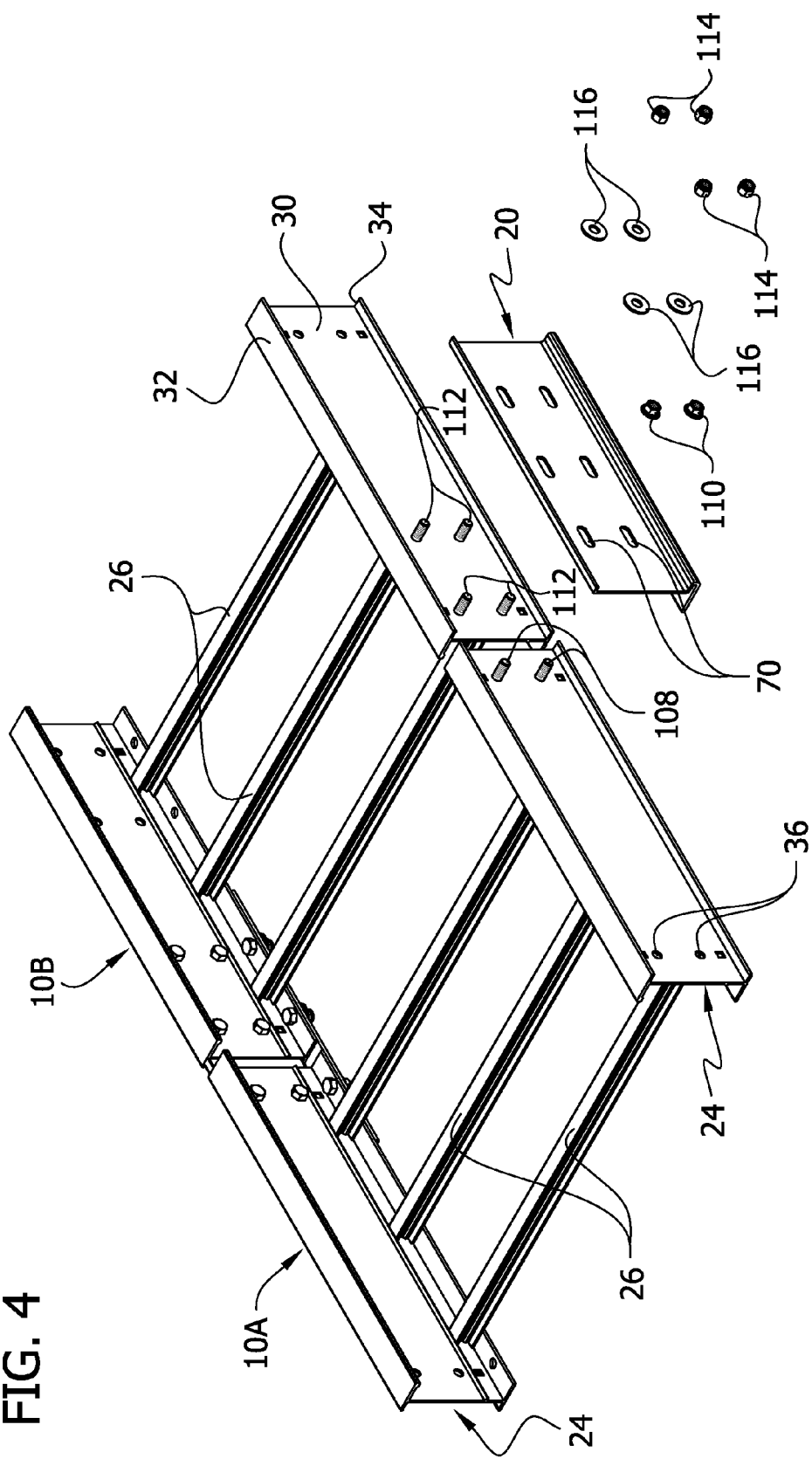
FIG. 4 is a view similar to FIG. 3 showing a splice plate of the present invention and fasteners exploded away from rails of the cable tray.
Figure 8B:
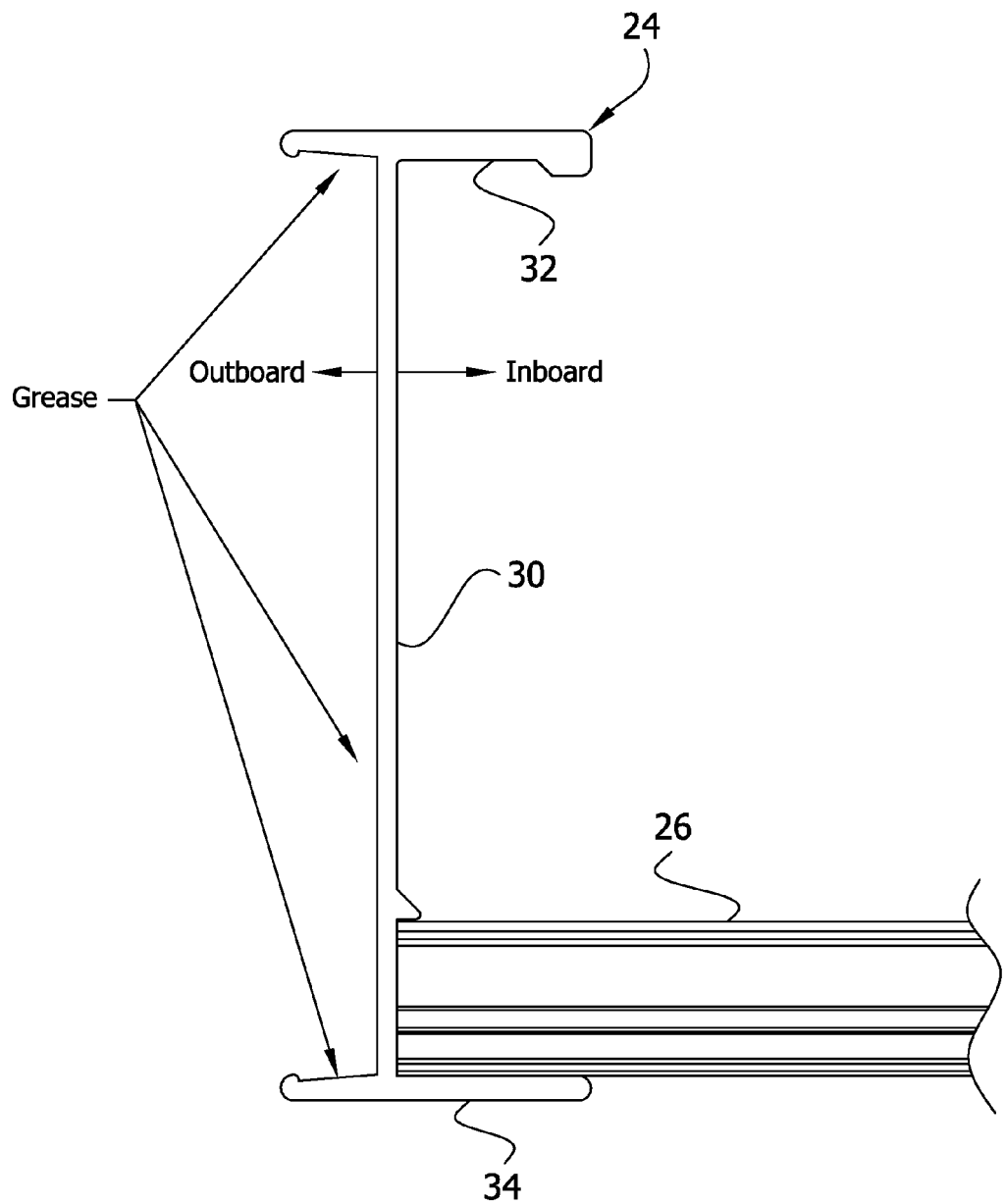

FIGS. 3 and 4 illustrate two sections 10A, 10B of ladder cable tray 10 connected by expansion splice plates 20 of the present invention. Each cable tray section includes two parallel rails 24 forming the sides of the cable tray section, and a plurality of cable-supporting rungs 26 extending between the rails 24 at intervals spaced lengthwise of the section. Each rail 24 comprises a generally vertical web 30, an upper generally horizontal flange 32 at the upper end of the web, and a lower generally horizontal flange 34 at the lower end of the web. The rungs 26 are secured (e.g., by welding) to inboard portions of the lower flanges 34 extending inboard from respective webs. Pre-drilled fastener holes 36 (FIG. 8A) are provided adjacent opposite ends of the rails for use in connecting the cable tray sections 10A, 10B to one another via splice plates, as will be described. In the illustrated embodiment, each rail 24 has three pre-drilled holes adjacent each of its ends. Two of the three holes 36 are in the web 30 of the rail, and one of the holes 36 is in the outboard portion of the lower flange 34. All three holes 36 lie substantially in the same vertical plane. This arrangement can vary. The length of each manufactured cable tray section may also vary (e.g., from 10-30 feet). Sections are often cut to fit in the field to varying lengths.

Figure 5:
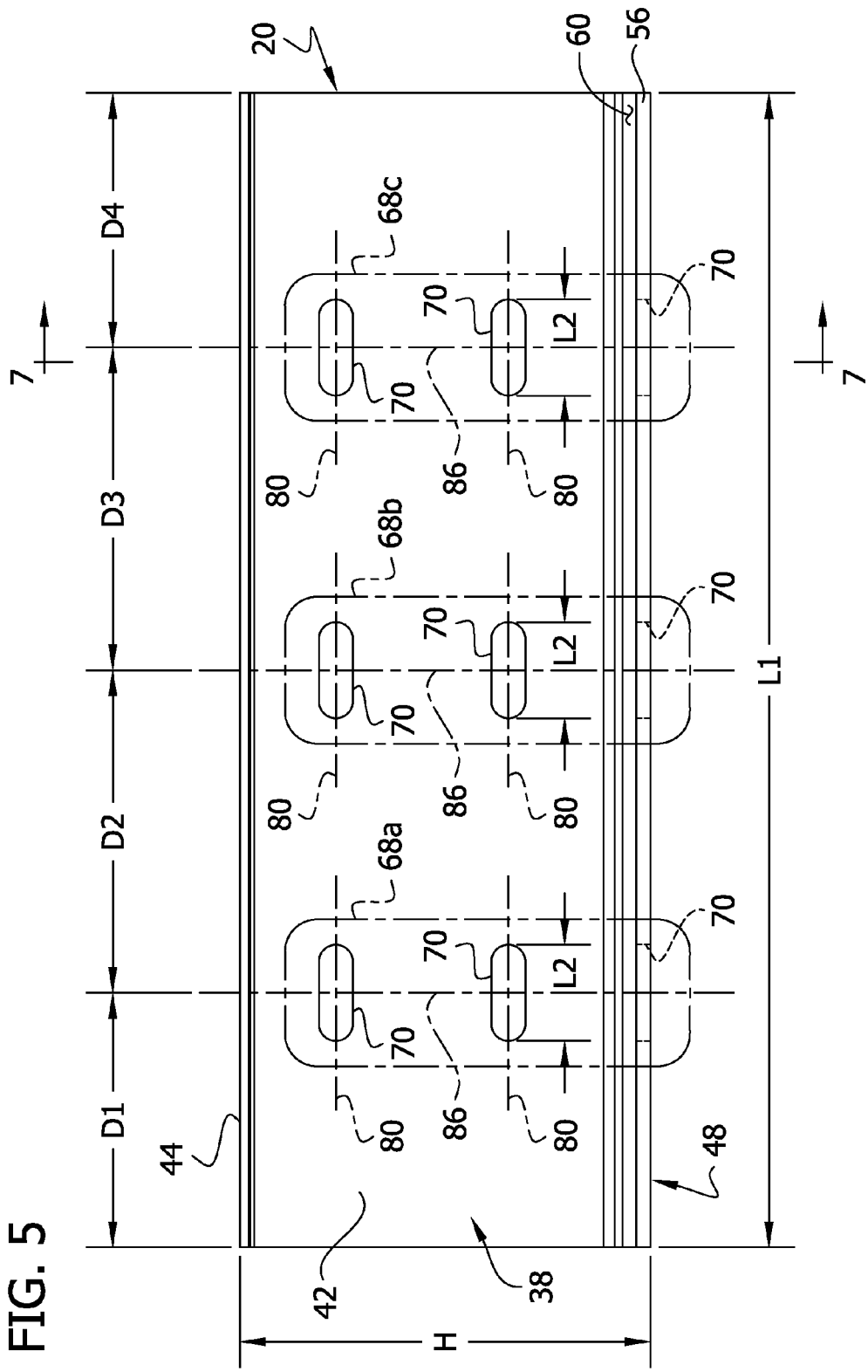
FIG. 5 is a side elevation of an expansion splice plate of FIG. 3.
Figure 6:
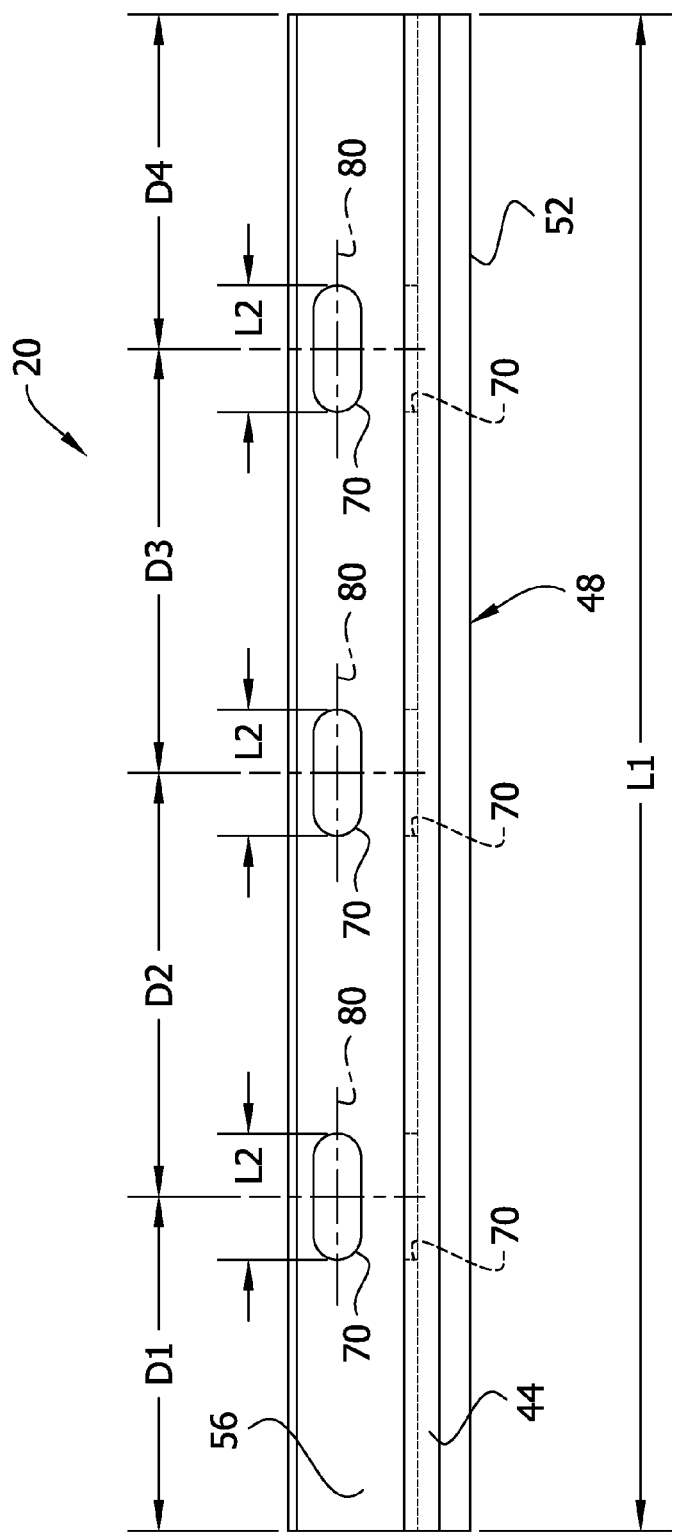
FIG. 6 is a top plan of the splice plate of FIG. 5.
Figure 7:
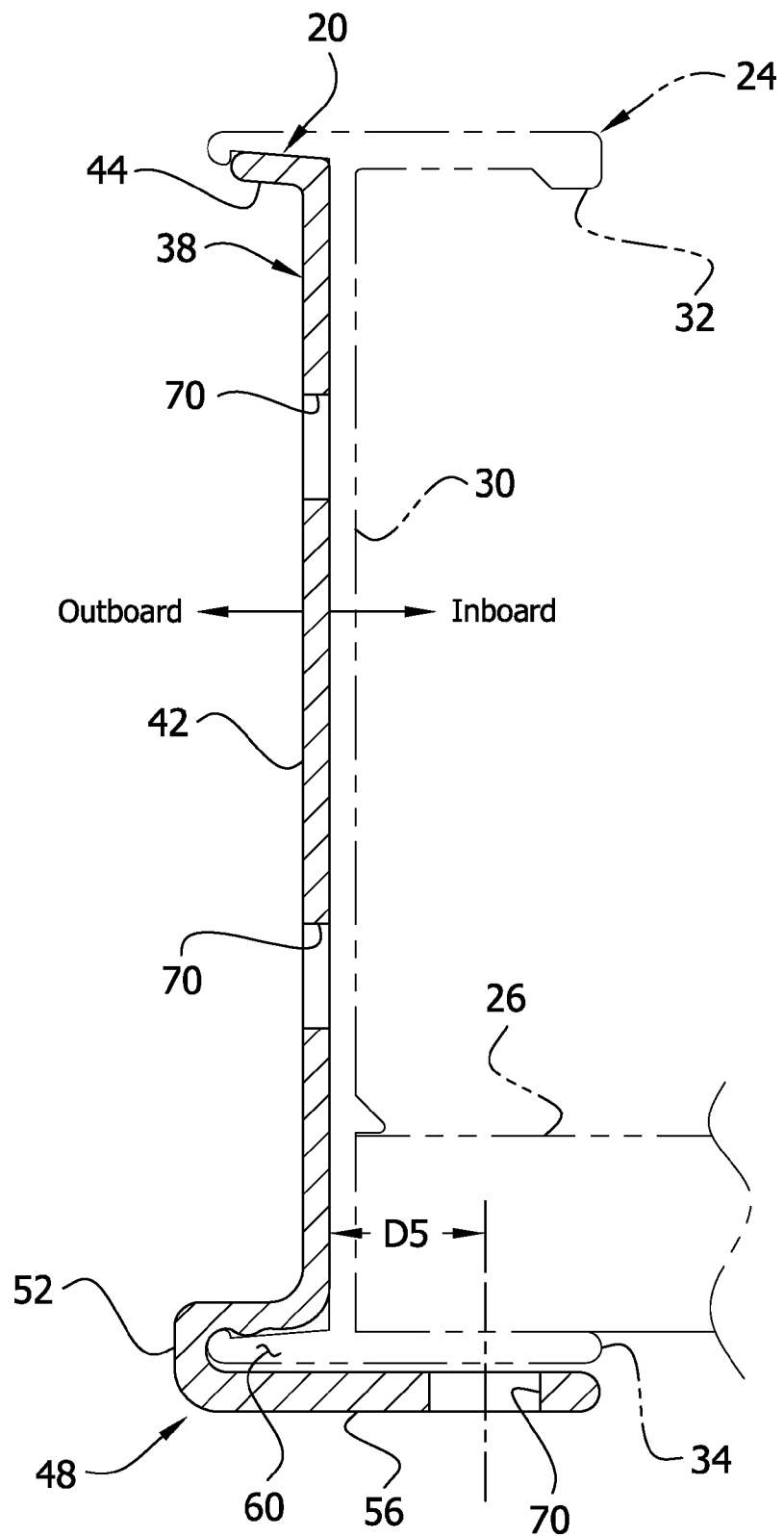
FIG. 7 is an end view of the splice plate of FIG. 5.

Referring to FIGS. 5-7, each expansion splice plate 20 includes an elongate body 38 having first and second longitudinal portions 38A, 38B opposite ends 40. The body 38 has an overall length L1; the first longitudinal portion 38A has a length L2; and the second longitudinal portion 38B has a length L3 (FIG. 5). Length L2 is greater than length L3. The body 38 includes a generally vertical rectangular planar central section 42, a top generally horizontal flange section 44 extending laterally outward (i.e., in an outboard direction) from an upper end of the central section, and a bottom channel section 48 at a lower end of the central section. The bottom channel section 48 has a heel portion 52 projecting laterally outward (i.e., in an outboard direction) from the central section 42 and a generally horizontal toe portion 56 projecting laterally inward (i.e., in an inboard direction) from the heel portion to a location inboard of the central section 42. The heel and toe portions 52, 56 define a channel 60 for receiving components of the two cable tray sections 10A, 10B. In the illustrated embodiment, these components are the outboard portions of the lower flanges 34 of the rails 24 of the two cable tray sections 10A, 10B, as described below.

The splice plates 20 are sized and dimensioned to have a relatively close abutting fit with the cable tray sections 10A, 10B to be connected by the plates. In the illustrated embodiment, shown in FIGS. 3 and 7, each plate 20 is sized and dimensioned to be placed in a splicing position in which it is nested between the upper and lower flanges 32, 34 of the two cable tray sections. In this position, the top flange section 44 of the plate extends generally parallel to and immediately below (desirably abutting) the upper flange 32 of the two cable tray sections 10A, 10B; the central section 42 of the plate 20 extends generally parallel to and immediately adjacent (desirably abutting) the vertical webs 30 of the cable tray sections on the outboard side of the rails 24; and the outboard portions of the lower flanges 34 of the cable tray sections are received in the channel 60 formed by the bottom channel section 48 of the splice plate such that the toe portion 56 underlies (desirably abutting) the lower flanges 34 of the cable tray sections. The fit is such that the top, central, and bottom sections 44, 42, 48 of the splice plates 20 are in contact (or near contact) with respective surfaces of the cable tray sections 10A, 10B.

Referring to FIGS. 5 and 6, the splice plate 20 includes three sets of openings 68a, 68b, 68c for receiving fasteners to secure the splice plate to adjacent cable tray sections 10A, 10B. The sets of fastener openings 68a, 68b, 68c are spaced apart along length L1 of the splice plate 20. In the illustrated embodiment, two sets of openings 68b, 68c are located in the second longitudinal portion 38B of the splice plate body 38, and only one set of openings 68a is located in the first longitudinal portion 38A of the splice plate body. Each set of openings includes three elongate, generally vertically-aligned slot-shaped openings 70, two of which are in the central section 42 and one of which is in the toe portion 56 of the bottom channel section 48. The slot openings 70 have major axes 80 extending along the length of the splice plate 10 to allow for relative movement between the cable tray sections 10A, 10B. The slot openings 70 have substantially the same length L2 (e.g., 1.5 in.). The three slot openings 70 in each respective set 68a, 68b, 68c have centers that are substantially aligned along the height H of the splice plate 20, i.e., the three slot openings of each set lie in a single plane 86 extending transverse to the splice plate through the slot centers. The slot openings 70 may have other configurations and may be arranged on the splice plate in other ways without departing from the scope of the invention.

In the illustrated embodiment, the vertical centerline 86 of the slot set 68a is spaced a distance D1 from the left end of the splice plate 20; the vertical centerline 86 of slot set 68b is spaced a distance D2 to the right of set 68a; and the vertical centerline 86 of slot set 68c is spaced a distance D3 to the right of set 68c and a distance D4 from the right end of the splice plate 20. As shown best in FIG. 7, the slot openings 70 in the toe portion 56 of the splice plate are offset a horizontal distance D5 outboard from the central section 42 of the plate. When the splice plate 20 is in its splicing position (FIGS. 3 and 7), the fastener openings 70 of sets 68a and 68b are positioned to align with the pre-drilled fastener holes 36 (FIG. 8A) in the webs 30 and lower flanges 34 of adjacent rails 24 of the two cable tray sections 10A, 10B to be spliced together. It is understood that the number and arrangement of fastener openings 70 in the splice plates 20 and aligned fastener holes in the cable tray sections may vary without departing from the scope of the present invention.

FIGS. 8A-8E illustrate exemplary steps for connecting the two cable tray sections 10A, 10B using two splice plates 20 positioned along opposite sides of the cable tray sections.

In step 8A, left and right cable tray sections 10A, 10B are positioned end to end with a gap G between the two sections. The gap G has a suitable width (e.g., 0.0 to 1.0 in.). The right cable tray section 10B is marked along lines 90 spaced a distance D6 from the left end of the cable tray section. (FIG. 8A shows only one mark 90 at one side of cable tray section 10B. A similar mark is made on the opposite side of the cable tray section 10B.) Distance D6 is such that when the splice plate is placed in its splicing position as shown in FIG. 8C, the pre-drilled fastener holes 36 of the two cable tray sections are located at the rights ends of respective slot openings 70 of sets 68a and 68b, and the line 90 is located at the right ends of the slot openings 70 of set 68c.

In step 8B, grease is applied to the surfaces of the cable tray sections 10A, 10B to be contacted by the two expansion splice plates 20 to facilitate relative movement between the plates and the sections. Desirably, these surfaces include the outboard surfaces of the webs 30 and the upper and lower flanges 32, 34 of the two cable tray sections.

Figure 8C:
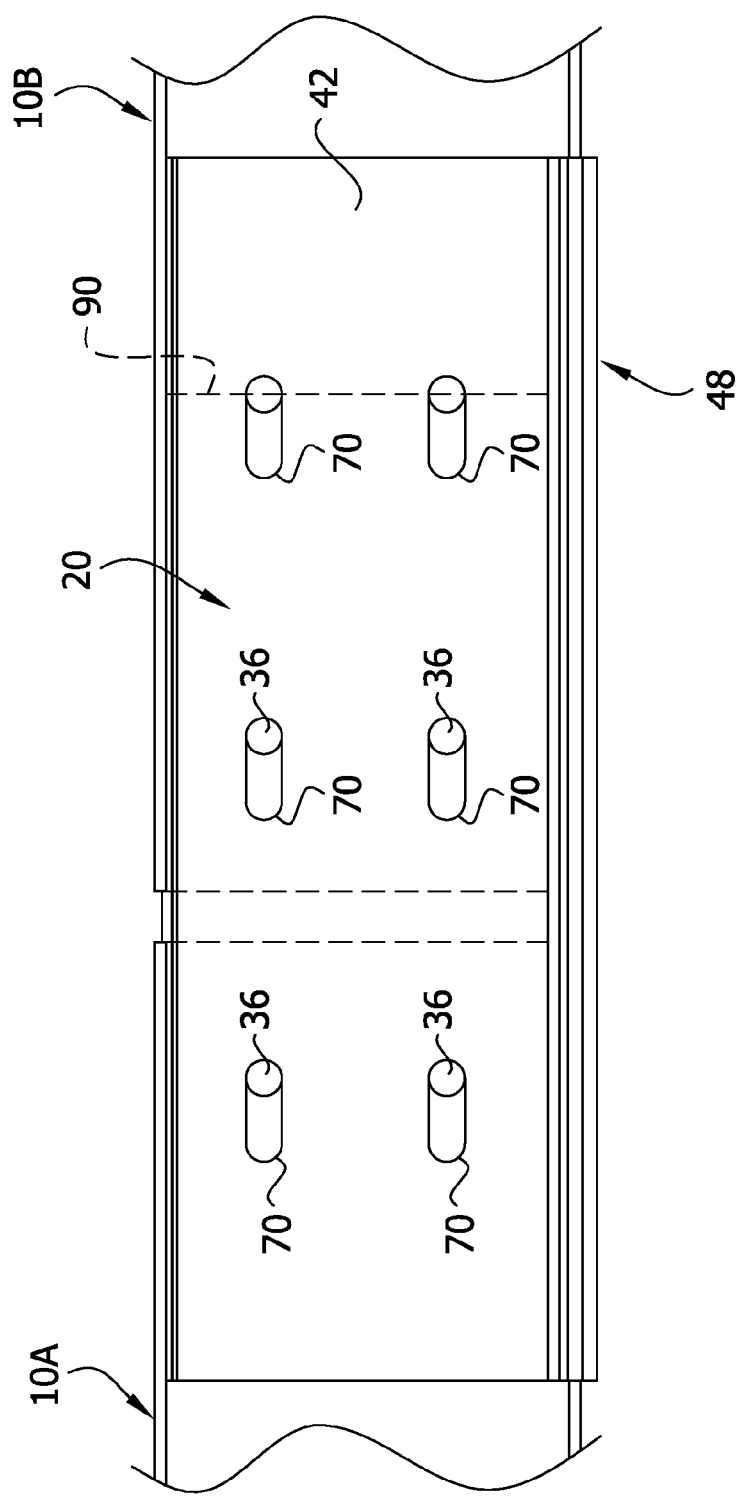

In FIG. 8C, the splice plates 20 are placed in their splicing positions in which the slot openings 70 in sets 68a, 68b are aligned with corresponding pre-drilled fastener holes in the webs and lower flanges of the rails of the two cable sections 10A, 10B, and the slot openings 20 in set 68c are aligned with the mark line 90. Additional fastener holes 94 are drilled in the rails at locations corresponding to the mark line 90 and fastener openings of set 68c. (FIG. 8C shows only one splice plate at one side of cable tray sections 10A, 10B. A second splice plate is similarly positioned on the opposite side of the cable tray sections, and similar fastener holes are drilled.)

In step 8D, fasteners 100 are installed through the slot openings 70 of set 60a of the splice plates 20 and through aligned pre-drilled fastener holes 36 in the web 30 and lower flange 34 of the rails 24 of the left cable tray section. Similarly, fasteners 104 are installed through the slot openings 70 of sets 60b and 60c of the splice plate and through aligned fastener holes 36, 94 in the web 30 and lower flange 34 of the rail 24 of the right cable tray section. (Only one splice plate 20 at one side of the cable tray sections is shown in FIG. 8D; a second identical splice plate is on the opposite side of the cable tray sections.) When the splice plates 20 are installed, the central section 42 of each splice plate 20 overlaps respective rails 24 of the adjacent cable tray sections 10A, 10B on the outboard sides of the rails. The fasteners 100, 104 function to splice the cable tray sections together while permitting longitudinal movement of the cable tray sections relative to one another, as during thermal expansion and contraction of the sections.

In the illustrated embodiment, each fastener 100 comprises an assembly including a bolt 108 and a serrated-flange hex nut 110 that threads on the bolt. Each fastener 104 comprises an assembly including a bolt 112, an elastic stop nut 114 that threads on the bolt, and a flat washer 116. Other fasteners may be used.

The fasteners 100, 104 are tightened after they are installed. By way of example but not limitation, the fasteners 100 may be tightened to a torque of 50 ft/lb. In the preferred embodiment, these fasteners 100 are tightened first and, when tight, do not move in their respective slots 70 of set 68a. The width of the gap G between the two cable tray sections 10A, 10B is then set according to certain temperature parameters (e.g., highest expected metal temperature, lowest expected metal temperature, and metal temperature at time of installation), as will be understood by those skilled in the art. After the gap G is set, the stop nuts 114 of the fasteners 104 are tightened until snug and then backed off a small amount (e.g., one-quarter turn) to permit relative movement of the bolts 112 in the slots of sets 68b and 68c. By way of example, in an installation where the length L2 of slots 70 is 1.5 in. and the bolts 112 have a shank diameter of 0.5 in., the range of travel of the bolts 112 in respective slots 70 is about 1.0 in.

In FIG. 8E, bonding jumpers 124 are installed to bridge the two cable tray sections on opposite sides of the two sections.

Figure 1:
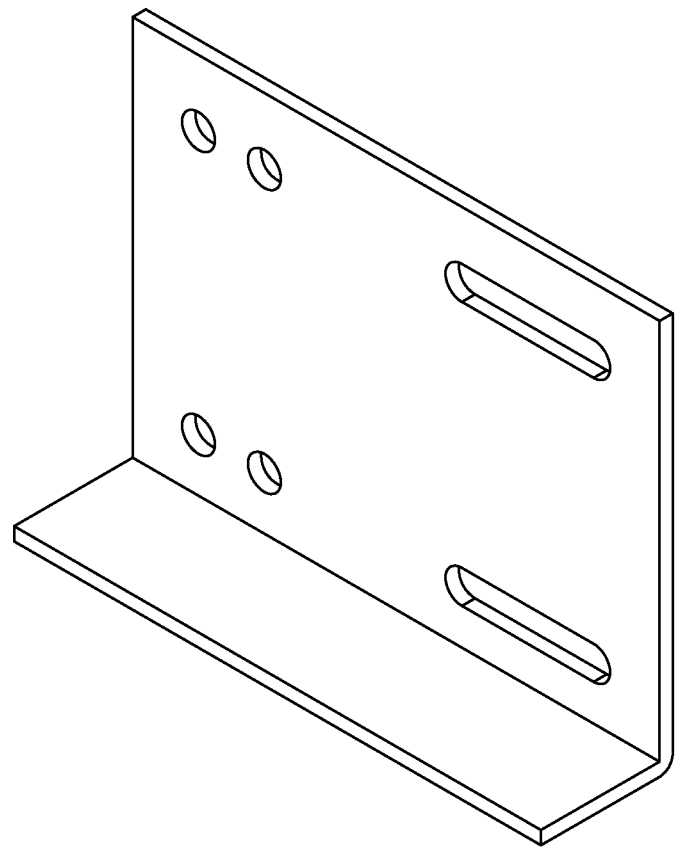
FIG. 1 depicts a conventional expansion splice plate for fiberglass cable tray.
Figure 2:
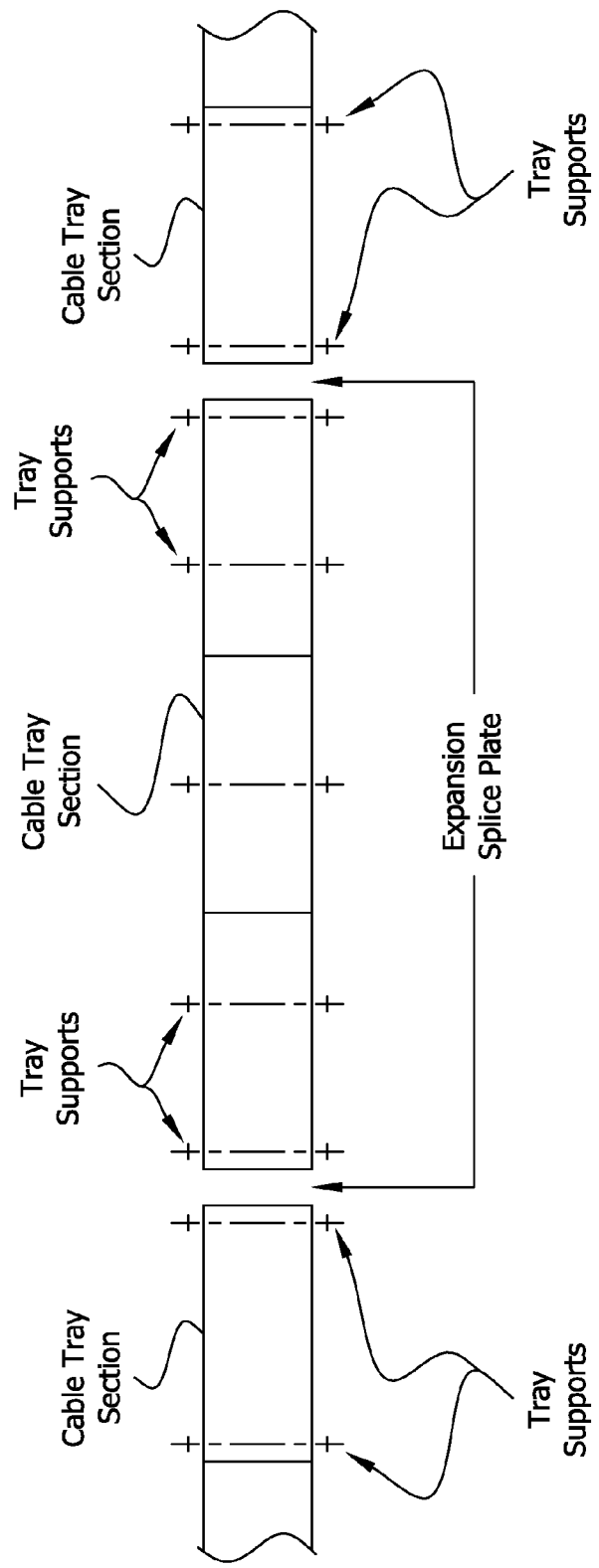
FIG. 2 is a schematic illustrating typical locations of supports for the cable tray run when using the conventional expansion splice plates of FIG. 1.
Figure 9:
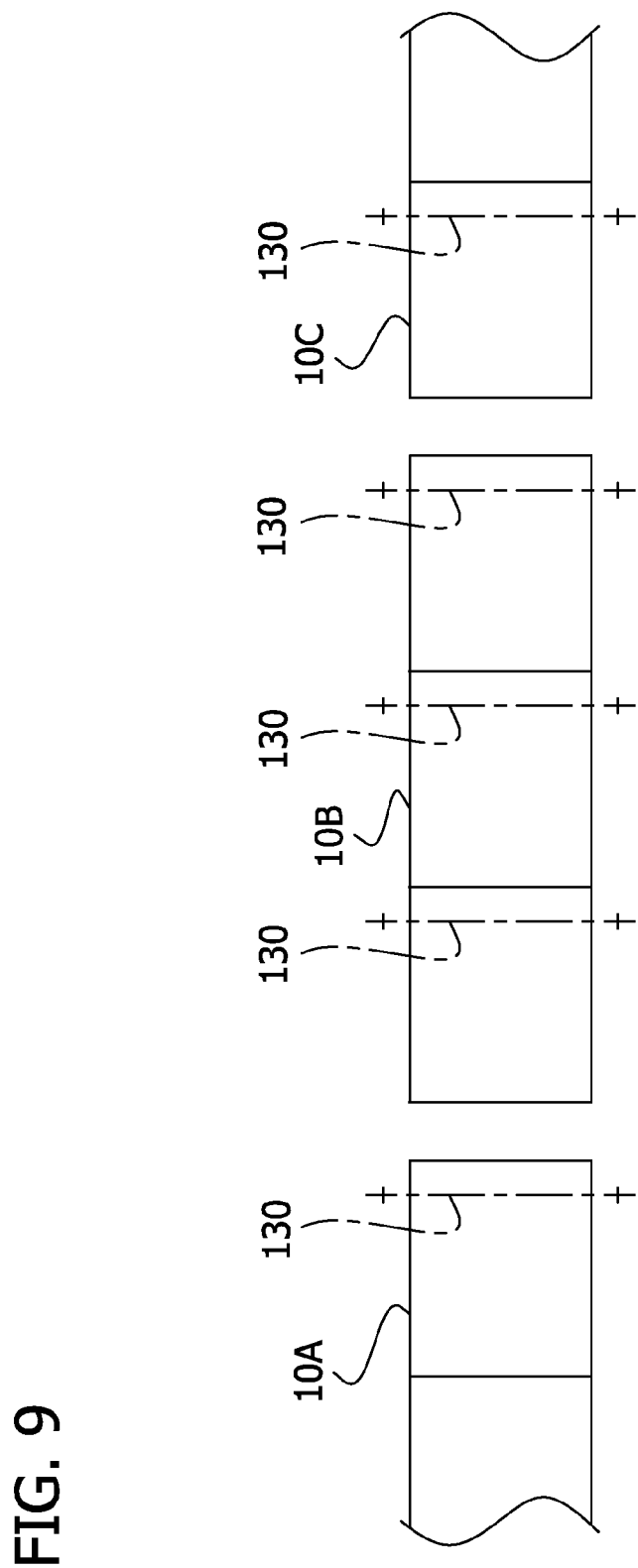
FIG. 9 is a schematic diagram illustrating locations of supports for the cable tray run when using the expansion splice plates of FIG. 3.

Additional cable tray sections may be connected to sections 10A, 10B, and 10C in the manner described above to form a cable tray run of the desired length. As shown in FIG. 9, supports 130, e.g., trapeze supports, are installed to support the cable run. These supports 130 are installed at regular intervals along the cable run, such as at every quarter span of the cable tray run. Unlike the prior art installations previously described (FIG. 2), additional supports do not need to be installed at each end of the adjacent tray sections because the splice plates provide adequate support at the splice. As a result, the support locations are easily determined, and the minimum number of supports can be installed at the correct locations. This facilitates installation, reduces expense, and reduces the deflection of the cable tray run compared to a situation where the sections are supported only at their ends.

The expansion splice plates 20 are fabricated from suitable material. By way of example, the splice plates may be made from fiberglass if used to connect fiberglass tray sections. On the other hand, the splice plates may be made from heavy-gage metal if used to connect metal cable tray. The metal may be, for example, extruded aluminum, or it may be sheet steel bent into the shape of the splice plate. Other ways of forming the expansion splice plate do not depart from the scope of the present invention.

Having described an embodiment of invention in detail, it will be apparent that modifications and variations are possible without departing from the scope of the invention defined in the appended claims. By way of example but not limitation, in some embodiments (e.g., embodiments where fiberglass splice plates are used to connect fiberglass cable tray sections), the lower flange section 49 of the splice plate 20 may be configured to underlie the cable tray sections 10*a*, 10B without forming a channel.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A cable tray assembly comprising:

a first cable tray section including two parallel rails forming sides of the first cable tray section, each rail of the first cable tray section includes a generally vertical web and a lower generally horizontal flange at a lower end of the web;

a second cable tray section including two parallel rails forming sides of the second cable tray section, each rail of the second cable tray section includes a generally vertical web and a lower generally horizontal flange at a lower end of the web;

a cable tray expansion splice plate connecting the first and second cable tray sections end-to-end, the splice plate including an elongate body having a length extending between opposite ends, a generally planar central section, an upper flange section extending laterally outward from an upper end of the central section, and a lower flange section extending laterally inward from a lower end of the central section, the lower flange section defining a channel for receiving the lower generally horizontal flange of each first and second cable tray sections such that the lower flange section underlies the lower generally horizontal flange of each rail a first set of generally vertically-aligned fastener openings in the central section and the lower flange section of a first longitudinal portion of the body and a first set of fasteners received in the respective fastener openings of the first set of fastener openings fastening the first longitudinal portion of the body to the first cable tray section, each fastener opening of the first set of fastener openings comprising a slot having a major axis extending lengthwise of the body to permit movement of the cable tray sections relative to one another in a direction extending longitudinally of the cable tray sections, a second set of generally vertically-aligned fastener openings in the central section and the lower flange section of the first longitudinal portion of the body spaced apart from the first set of fastener openings along the length of the body and a second set of fasteners received in the respective fastener openings of the second set of fastener openings fastening the first longitudinal portion of the body to the first cable tray section, each fastener opening of the second set of fastener openings comprising a slot having a major axis extending lengthwise of the body to permit movement of the cable tray sections relative to one another in a direction extending longitudinally of the cable tray sections, a third set of generally vertically-aligned fastener openings in the central section and the lower flange section of a second longitudinal portion of the body and a third set of fasteners received in the respective fastener openings of the third set of fastener openings fastening the second longitudinal portion of the body to the second cable tray section, each fastener opening of the third set of fastener openings comprising a slot having a major axis extending lengthwise of the body to permit movement of the cable tray sections relative to one another in a direction extending longitudinally of the cable tray sections, wherein the first longitudinal portion of the body has a length that is greater than a length of the second longitudinal portion of the body, whereby the first longitudinal portion of the body provides sufficient support to the first longitudinal end of the first cable tray section so that a cable tray support does not need to be installed adjacent the first longitudinal end of the first cable tray section, and wherein the third set of fastener openings is the only set of generally vertically-aligned fastener openings in the central section and the lower flange section of the second longitudinal portion of the body.

2. The cable tray assembly of claim 1, wherein the first and second set of fastener openings are the only set of generally vertically-aligned fastener openings in the central section of the first longitudinal portion of the body.

3. A cable tray assembly comprising:

a first cable tray section including two parallel rails forming sides of the first cable tray section and a first longitudinal end, each rail of the first cable tray section includes a generally vertical web and a lower generally horizontal flange at a lower end of the web;

a second cable tray section including two parallel rails forming sides of the second cable tray section and a second longitudinal end, each rail of the second cable tray section includes a generally vertical web and a lower generally horizontal flange at a lower end of the web;

a cable tray expansion splice plate connecting the first and second cable tray sections end-to-end so that said first and second longitudinal ends of the respective first and second cable tray sections are adjacent one another, the splice plate including an elongate body having a length extending between opposite ends, and a generally planar central section, an upper flange section extending laterally outward from an upper end of the central section, and a lower flange section extending laterally inward from a lower end of the central section, the lower flange section defining a channel for receiving the lower generally horizontal flange of each of the first and second cable tray sections such that the lower flange section underlies the lower generally horizontal flange of each rail, a first set of fastener openings in the central section and the lower flange section of a first longitudinal portion of the body and a first set of fasteners received in the respective fastener openings of the first set of fastener openings fastening the central section of the first longitudinal portion of the body to the first cable tray section, each fastener opening of the first set of fastener openings comprising a slot having a major axis extending lengthwise of the body to permit movement of the cable tray sections relative to one another in a direction extending longitudinally of the cable tray sections, a second set of fastener openings in the central section and the lower flange section of the first longitudinal portion of the body spaced apart from the first set of fastener openings along the length of the body and a second set of fasteners received in the respective fastener openings of the second set of fastener openings fastening the central section of the first longitudinal portion of the body to the first cable tray section, each fastener opening of the second set of fastener openings comprising a slot having a major axis extending lengthwise of the body to permit movement of the cable tray sections relative to one another in a direction extending longitudinally of the cable tray sections, a third set of fastener openings in the central section and the lower flange section of a second longitudinal portion of the body and a third set of fasteners received in the respective fastener openings of the third set of fastener openings fastening the central section of the second longitudinal portion of the body to the second cable tray section, each fastener opening of the third set of fastener openings comprising a slot having a major axis extending lengthwise of the body to permit movement of the cable tray sections relative to one another in a direction extending longitudinally of the cable tray sections, wherein the central section of the first longitudinal portion of the body has a length that is greater than a length of the central section of the second longitudinal portion of the body, whereby the first longitudinal portion of the body provides sufficient support to the first longitudinal end of the first cable tray section so that a cable tray support does not need to be installed at the first longitudinal end of the first cable tray section.

4. The cable tray assembly of claim 3, wherein the third set of fastener openings is the only set of generally vertically-aligned fastener openings in the central section of the second longitudinal portion of the body, and the first and second set of fastener openings are the only set of generally vertically-aligned fastener openings in the central section of the first longitudinal portion of the body.

5. The cable tray assembly of claim 3, wherein the lower flange section of the body comprises a heel portion projecting outward from the central section and a toe portion projecting inward from the heel portion to a location inboard of the central section.

6. The cable tray assembly of claim 3, wherein each of the first, second, and third sets of fastener openings includes two slots in the central section-and one slot in the toe portion of the lower flange section.

7. The cable tray assembly of claim 3, wherein the slots of each set of the first, second, and third sets lie in a single plane extending transversely of the splice plate.

8. The cable tray assembly of claim 3, wherein the splice plate is free from other sets of fastener openings in the central section and the lower flange section.

9. The cable tray assembly of claim 3, in combination with a plurality of cable tray supports supporting the cable tray assembly, wherein each and every one of the cable tray supports is installed at a regular interval along a length of the cable tray assembly.

10. The cable tray assembly of claim 9, wherein each and every one of the cable tray supports is installed at a quarter span of the cable tray assembly.

11. The cable tray assembly of claim 3, wherein the length of the first longitudinal portion constitutes a majority portion of the length of the body.

12. The cable tray assembly of claim 9, wherein the second longitudinal end of the second cable tray section is supported by one of the cable tray supports and the first longitudinal end of the first cable tray section is not supported by any of the cable tray supports.

* * * * *